Jan. 10, 1933. B. F. BLAKE Re. 18,712

SUCTION CLEANER AGITATOR

Original Filed Feb. 20, 1929

Inventor
B. F. Blake, deceased
The Hoover Company, Assignee
by Harry S. Dimarse
Attorney Reissued Jan. 10, 1933

Re. 18,712

UNITED STATES PATENT OFFICE

BENJAMIN F. BLAKE, DECEASED, LATE OF MARION, OHIO, BY THE HOOVER COMPANY, ASSIGNEE, OF NORTH CANTON, OHIO, A CORPORATION OF OHIO

SUCTION CLEANER AGITATOR

Original No. 1,743,954, dated January 14, 1930, Serial No. 341,449, filed February 20, 1929. Application for reissue filed December 26, 1931. Serial No. 583,413.

The invention relates to a new and improved rotary agitator for a suction cleaner.

An object of the invention is the provision of an agitator in the form of a cylinder having beater elements resiliently mounted and adapted to be so position within the nozzle of the suction cleaner that in the operation of the machine and upon the rotation of the agitator the said elements will contact the surface covering undergoing cleaning.

A further object of the invention is the provision of an agitator in the form of a cylinder which is adapted to be revolved adjacent the opening in a suction housing and which comprises a cylinder enclosing a pressure block for maintaining a plurality of elastic holders in operative relation with agitating elements and in engagement with the inner walls of the cylinder whereby the agitating elements, elastic holders and block may be readily removed from the cylinder.

A still further object of the invention is the provision of a new and improved rotary agitator for a suction cleaner which comprises a large diameter body relative to which a surface-contacting beater element, which extends but a relatively short distance beyond the surface of said body, is resiliently mounted.

Still another object of the present invention is the provision of a new and improved rotary agitator for a suction cleaner in which axially elongated beater elements are resiliently mounted.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

Figure 1:
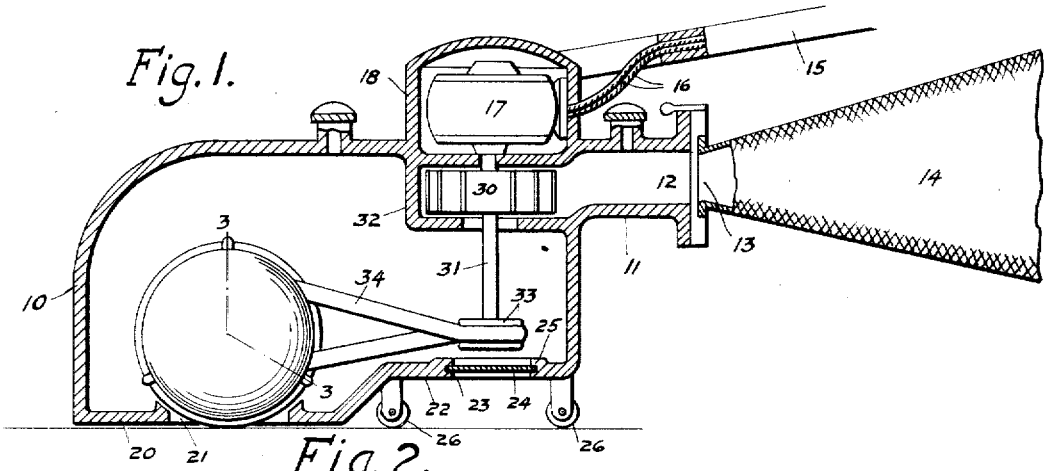
Figure 1 is a longitudinal vertical section through a suction cleaner showing the present invention embodied therein.

Referring more particularly to the drawing, 10 designates a casing or housing having a reduced portion at 11 to provide a discharge passageway 12 which is open at 13 to a dust bag 14 adapted to receive and collect the dust and dirt removed from the covering undergoing cleaning. A handle 15 is connected in any approved manner to the housing 10 and carries electric wires 16 which are connected with a motor 17 in an auxiliary housing 18, the wires 16 being adapted to be connected in any approved manner with the house current.

The bottom of the housing, as shown at 20, is flat and is adapted to lie in close association with the carpet which is to be cleaned. The bottom is provided with an opening 21 which connects the interior of the housing with the atmosphere. A portion of the base, as shown at 22, is offset from the plane of the portion 20 and is provided with an opening 23 for the purpose of permitting inspection of the interior of the housing 10 and for facilitating repairs to the mechanism within the housing. The opening 23 is adapted to be closed by a door 24 slidably mounted in grooves 25 formed in the bottom portion 22. Casters 26 support the elevated base portion 22 on the floor to provide means for readily conveying the sweeper over the carpet.

The motor 17 drives a fan 30 which is secured to a shaft 31 projecting below a fan housing 32 which is in communication with the passage 12. A pulley 33 is secured to the lower end of the shaft 31 and has trained thereon a belt 34 which is also trained upon a pulley 35.

The agitator is shown more particularly in Figures 2 to 7, inclusive, and includes a pair of cylinders generally designated by the numerals 40 and 41 which are normally closed at their outer ends by means of caps 42 and 43, respectively. Closures 43*a* and 44 are connected to the inner ends of the cylinders in any approved manner. The pulley 35 is rigidly connected with the inner adjacent ends 43*a* and 44 so that the pair of cylinders are revolved simultaneously. The outer ends 42 and 43 of the cylinders 40 and 41, respectively, are made convex so that they will fit in sockets in the end walls of the housing 10.

Figure 2:
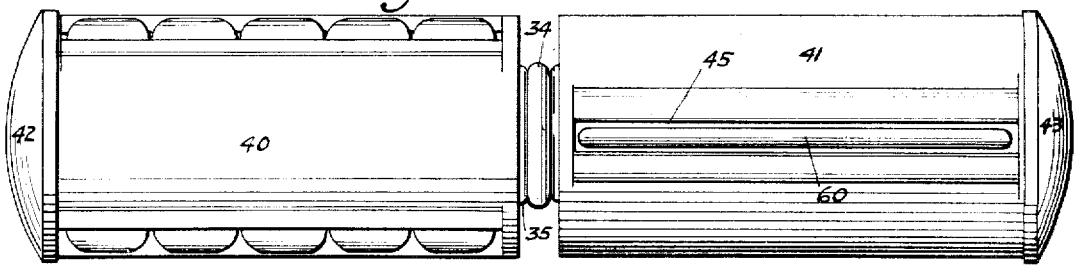
Figure 2 is a longitudinal side view of the agitator.
Figure 3:
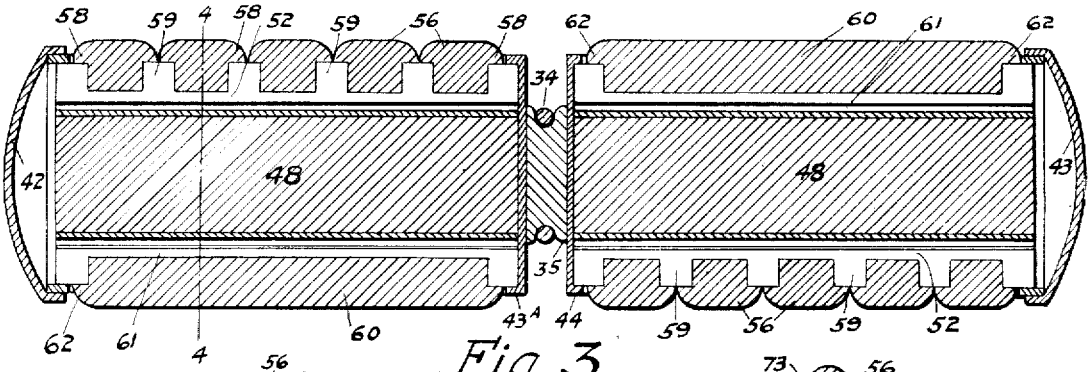
Figure 3 is a longitudinal section taken along the line 3—3 of Figure 1.
Figure 4:
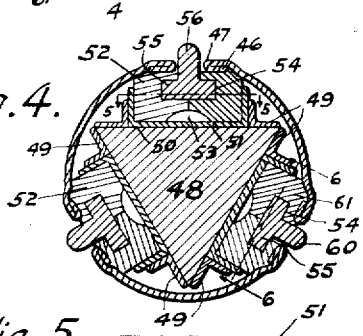
Figure 4 is transverse vertical section taken upon the line 4—4 of Figure 3.

Each cylinder is provided with longitudinal slots 45 separated from one another 120 degrees circumferentially although any number of slots may be provided which will be sufficient for the purpose. These slots are formed, in the modification of the invention shown in Figs. 2 to 6, inclusive, and as clearly shown in Fig. 4, by slitting each cylinder longitudinally and bending the portion of the metal on opposite sides of the slit inwardly as shown at 46 to provide a reinforced edge 47 for a purpose which will be presently explained. A triangularly-shaped block 48 is located centrally of each cylinder and is provided with spaced angle irons 49 at each face 50 of the block 48 to provide a seat for a metallic U-shaped member 51. In two of the seats are mounted a pair of elastic or resilient holders 52 which are complementarily formed and extend longitudinally of the U-shaped member 51. The inner or bottom portion of each member as shown at 53 is cut away to provide a space between the bottom of the U-shaped member and the bottom of the holders 52. Each holder is provided with a groove 54 to receive a flange 55 of a beater element 56 which is T-shaped in cross section. The outer longitudinal edge of each section of the holder is sheared off at an angle and engages a portion of the inner wall of the cylinder. It will be noted that the agitating elements 56 in Figs. 2 and 3 are relatively short axially and are arranged in rows at closely spaced intervals, each of the elements being individually seated in the resilient holders at spaced points. The outer edge of the agitating elements project over the outer face of the cooperating section 52 of the holder, as shown at 58. The portions of the holders, as shown at 59, extend between each agitating element 56 for spacing the agitating elements longitudinally of the holder.

The agitating element 60, as compared to the relatively small agitating elements 56, is of great axial length and extends approximately the length of the associated holders 61 and since the agitating element extends throughout the approximate length of a holder the spacing portions 59 of the holder shown in Fig. 3 are omitted. However, the undercut grooves 54 are formed in the associated sections of the holders to receive the flanges 55 of the agitating element 60 for securing the agitating element in position. The opposite ends of the agitating element adjacent the outer surfaces of the sections of the holder are extended, as shown at 62, to overlap the portions of the holders adjacent their ends.

It will be seen by this construction that when the block 48 is inserted within the cylinder the sections of the holder which are located within the U-shaped member 51 are readily moved into place between the angle irons 49 with the agitating element 56 or 60 projecting through the respective slots of the cylinder at approximately 120 degrees apart.

Figure 7:
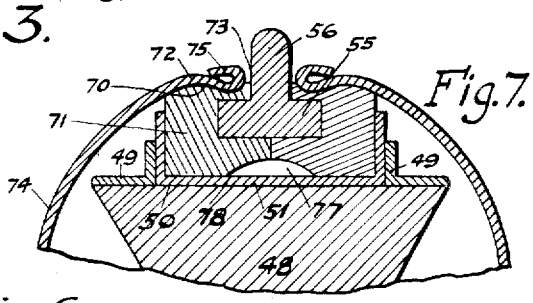
Figure 7 is a partial transverse cross-section of a modified form of the agitator comprising the present invention.
Figure 5:
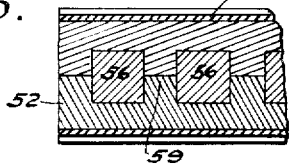
Figure 5 is a section taken upon the line 5—5 of Figure 4.
Figure 6:
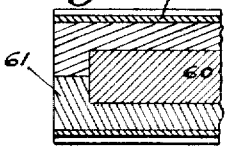
Figure 6 is a section upon the line 6—6 of Figure 4.

The construction shown in Fig. 7 is similar to that shown in Figs. 2 to 6, inclusive, except that the outer surface 70 of a section 71 of a holder is curved to conform to the inwardly curved portions 72 adjacent the slot or passage 73 in the cylinder 74. The walls of the cylinder adjacent the slots 73, as shown at 75, are bent outwardly and returned upon the cylinder to provide a reinforcing flange or rib. The agitating element 56 projects through the slot and has its flanged ends 55 secured within the undercut grooves within the resilient section 71 of the holder. The bottom of the sections, as shown at 77, are cut away to reduce those portions of the sections adjacent the bottom 78 of the U-shaped trough or member 51.

By the above construction it will be seen that the agitator may be readily assembled or disassembled without the necessity of the employment of screws or bolts or any fastening means whatever. It is only necessary to slide the block 48 in its place within the cylinder and then to insert the sections of the holder which is mounted within the U-shaped member or between the angle irons 49. The elastic sections of the holder permit the agitating elements 56 or 60 to be moved inwardly since the portions 77 of the section is weakened by the reduced portions at these points. Furthermore, the elasticity of the sections of the holders themselves permit the sliding inward movement of the agitating elements. Furthermore, when the block 48 is moved into position it will force the sections of the holder outwardly and cause them to frictionally engage the portions of the inner wall of the cylinder adjacent the slots 45 or 73.

In the operation of the improved agitator comprising the present invention in a section cleaner many new and desirable effects and results accrue from the resilient mounting of the agitating elements. Decreased noise of operation as well as the ability to be deflected upon encountering a rigid protrusion characterize the invention. The beating elements being mounted in resilient seats are unrestricted and are permitted movement radially and circumferentially relative to the body of the agitator and through having but a relatively small height above the surface of the agitator body do not collect foreign matter while being able to accomplish great surface covering vibration and agitation.

What is claimed is:

1. A suction cleaner agitator comprising a cylinder having spaced slots, a triangularly shaped block within the cylinder provided with seats, elastic holders mounted in the seats and having longitudinally disposed edges coacting with the inner walls of the cylinder, and beater elements mounted in the holders and projecting through the slots.

2. A suction cleaner agitator comprising a cylinder having spaced slots, a block in the cylinder carrying seats, holders located in the seats, agitator elements carried by the holders and projecting through the slots, portions of the holders engaging the inner walls of the cylinder for aiding and supporting the holders and block within the cylinder.

3. A rotatable suction cleaner agitator comprising a cylinder having spaced slots, a block in the cylinder carrying seats, plastic holders located in the seats, agitating elements carried by the holders and projecting through the slots, portions of the holders engaging the inner walls of the cylinder for aiding and supporting the holders and block within the cylinder.

4. A rotatable suction cleaner agitator comprising a cylinder having spaced slots, a block in the cylinder carrying seats, holders located in the seats, agitating elements carried by the holders and projecting through the slots, portions of the holders engaging the inner walls of the cylinder for aiding and supporting the holders and block within the cylinder, the block being triangularly shaped in cross sections and acting as a wedge for forcing the holders against the inner walls of the cylinder.

5. A rotatable suction cleaner agitator comprising a cylinder having spaced slots, a block in the cylinder carrying seats, holders located in the seats, agitating elements carried by the holders and projecting through the slots, portions of the holders engaging the inner walls of the cylinder for aiding and supporting the holders and block within the cylinder, the holders being formed of complementary parts adapted to be fitted together and held in operative relation by the pressure exerted by the block.

6. A suction cleaner agitator comprising a cylinder having spaced slots, a block in the cylinder carrying seats, holders located in the seats, agitating elements carried by the holders and projecting through the slots, portions of the holders engaging the inner walls of the cylinder for aiding and supporting the holders and block within the cylinder, the holders having undercut grooves, the agitating elements having flanges received by the grooves.

7. A suction cleaner agitator comprising a cylinder having spaced slots, a block in the cylinder carrying seats, holders located in the seats, agitating elements carried by the holders and projecting through the slots, portions of the holders engaging the inner walls of the cylinder for aiding and supporting the holders and block within the cylinder, the holders being formed of complementary members, each member having a longitudinal groove, the agitating elements having flanges received by the grooves.

8. In a rotary agitator for a suction cleaner, a cylindrical body, means to rotatably support said body, a rigid surface-contacting beating element having a height above said body which is relatively small as compared to the diameter of said body, and a resilient member within the body resiliently mounting said beating element.

9. In a rotary agitator for a suction cleaner, a body, means to rotatably support said body for rotation, a surface-contacting beater element extending radially from the axis of rotation a relatively short distance beyond the surface of said body as compared to the size of said body, and a body of resilient material seating said element and connecting it to said body.

10. In a rotary agitator for a suction cleaner, a cylindrical body, means to rotatably support said body, a beater element, means resiliently mounting said element on said body, characterized by the fact that said beater element is positioned partly within and partly outside said body.

11. In a rotary agitator for a suction cleaner, a cylindrical body, a longitudinally extending beater element positioned partly within and partly outside the circumference of said body, and means resiliently mounting said element on said body.

12. In a rotary agitator for a suction cleaner, a cylindrical body, a surface-contacting beater element extending radially beyond said body from a point therein, and a body of rubber by contacting said element in said body at a plurality of points in different planes and thereby resiliently opposing its movement in a plurality of directions.

13. In a rotary agitator for a suction cleaner, a body, a series of agitating elements arranged longitudinally of said body, and an elongated body of resilient material carried by said body enclosing portions of said elements and providing individual spaced seats therefor.

14. In a rotary agitator for a suction cleaner, a cylindrical body, an elongated rigid beating element, means resisting inward radial movement of said element relative to said body and means resistingly opposing angular movement of said element relative to said body.

15. In a rotary agitator for a suction cleaner, a cylindrical body, a beating element extending from a point within said body to a point outside thereof, means to resiliently opposite outward radial movement of said element, and means to oppose inward radial movement of said element.

16. In a rotary agitator for a suction cleaner, a cylindrical body having an aperture in its surface, a beating element extending from a point inside said body through said aperture to a point outside thereof and spaced from said body, and means resiliently mounting said element relative to said body.

17. In a rotary agitator for a suction cleaner, a cylindrical body, means adapted to rotatably support said body, a beater element extended from a point within the normal contour of said body to a point therebeyond and adapted to contact a surface covering undergoing cleaning upon rotation of said agitator, and means resiliently mounting said beater relative to said body.

18. In a rotary agitator for a suction cleaner, a cylindrical body, means to rotatably support said body, a rigid beater element extended a relatively small distance beyond the normal contour of said body as compared to the distance from a surface-contacting point on said element to the axis of rotation, and a member resiliently opposing radial movement of said beater element.

Signed at Chicago, in the county of Cook and State of Illinois, this 22nd day of December, A. D. 1931.

THE HOOVER COMPANY,
*Assignee of Benjamin F. Blake, Deceased,*
By HOWARD EARL HOOVER,
*Vice-President.*

CERTIFICATE OF CORRECTION.

Reissue No. 18,712. January 10, 1933.

THE HOOVER COMPANY.

It is hereby certified that error appears in the printed specification of the above numbered patent requiring correction as follows: Page 3, line 29, claim 3, for "plastic" read "elastic", and line 117, claim 12, after "rubber" insert the word "supporting"; page 4, line 9, claim 15, for "opposite" read "oppose"; and that the said Letters Patent should be read with these corrections therein that the same may conform to the record of the case in the Patent Office.

Signed and sealed this 9th day of May, A. D. 1933.

M. J. Moore.

(Seal) Acting Commisioner of Patents.